United States Patent [19]
Samuels et al.

[11] 3,765,755
[45] Oct. 16, 1973

[54] MICROIMAGE VIEWER

[75] Inventors: Joseph P. Samuels; Paul A. Hummel; John G. Roff, all of St. Charles, Ill.

[73] Assignee: Du Kane Corporation, St. Charles, Ill.

[22] Filed: Oct. 18, 1971

[21] Appl. No.: 190,233

[52] U.S. Cl. .................... 353/27, 353/76, 353/101
[51] Int. Cl. .......................................... G03b 23/08
[58] Field of Search .................... 353/27, 22–24, 353/39, 95, 76, 77, 101

[56] References Cited
UNITED STATES PATENTS
| | | | |
|---|---|---|---|
| 3,446,552 | 5/1969 | Gross et al. | 353/76 |
| 3,424,524 | 1/1969 | Akiyama et al. | 353/39 |
| 3,224,326 | 12/1965 | Brownscombe | 353/76 |
| 1,954,876 | 4/1934 | Joannides | 353/101 |
| 2,260,551 | 10/1941 | Boni et al. | 353/27 |

FOREIGN PATENTS OR APPLICATIONS
699,594  12/1930  France .................. 353/27

Primary Examiner—Harry N. Haroian
Attorney—Robert L. Kahn

[57] ABSTRACT

A viewer in which a light source and lens are utilized for providing a magnified reproduction of a character carried on a film card including a film card holder positioned substantially in a vertical plane and perpendicular to the optical axis of the magnifying lens, the film card holder is movable in the vertical plane between a film card viewing condition and a film card changing condition. Means for focusing the lens and means for scanning the film card are provided. Additionally, the film card may be rotated through an angle of 90° while the film card holder is in the film card viewing condition thereof.

3 Claims, 13 Drawing Figures

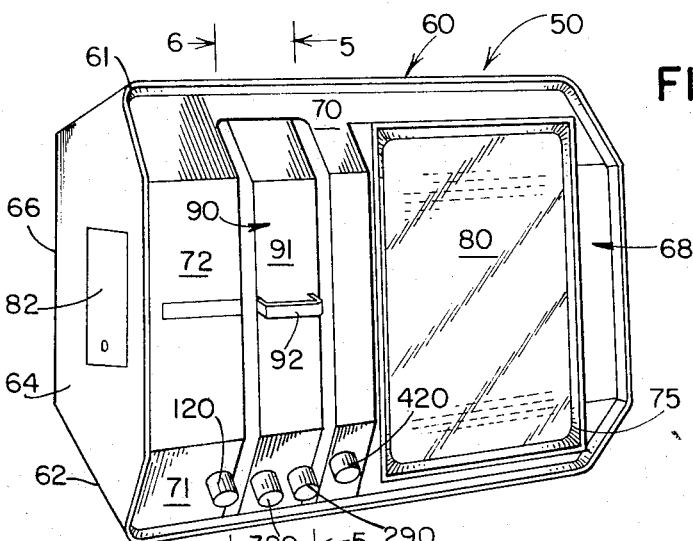
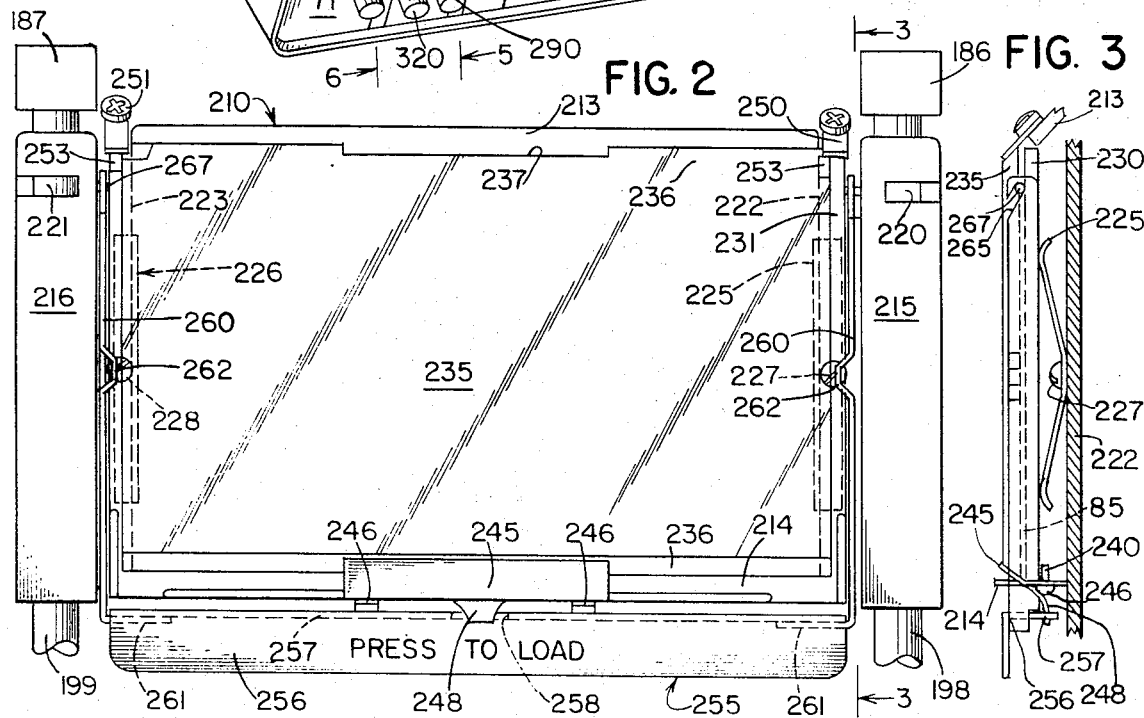
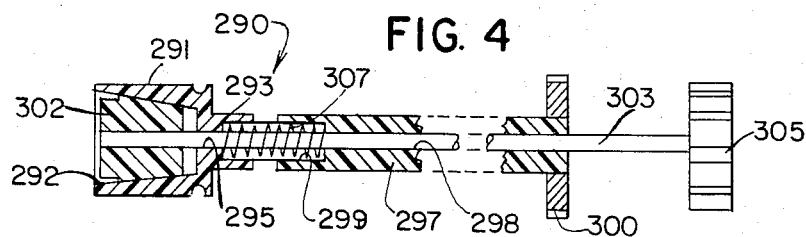

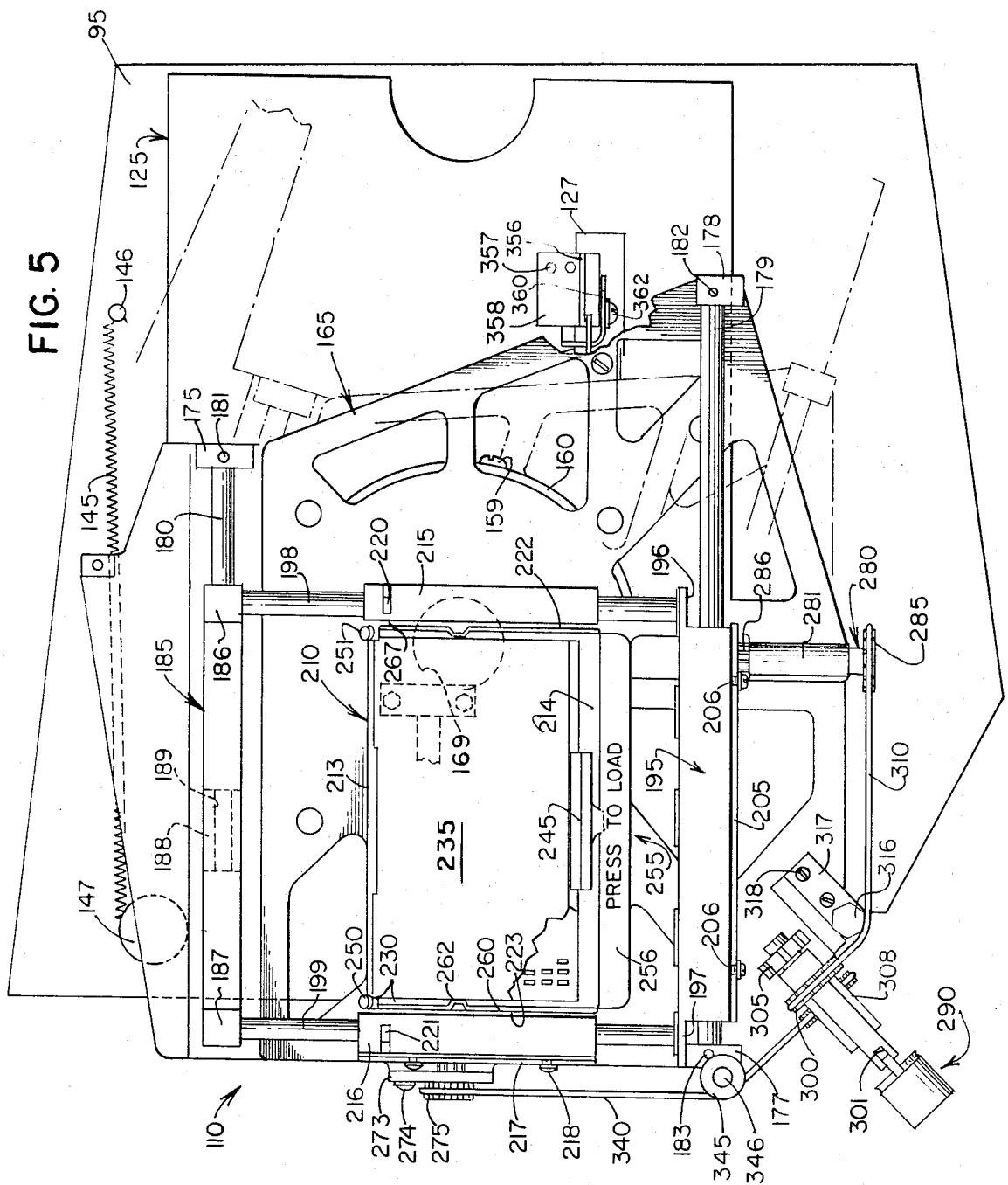

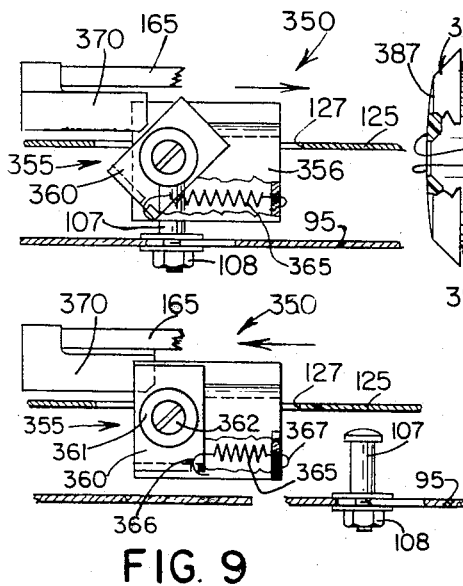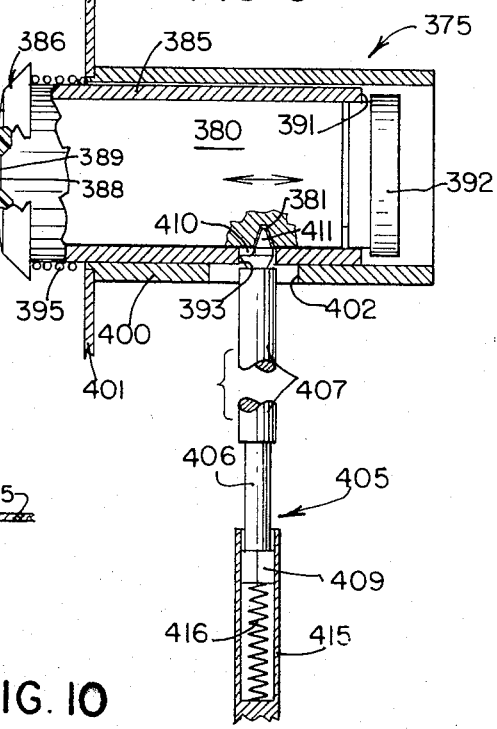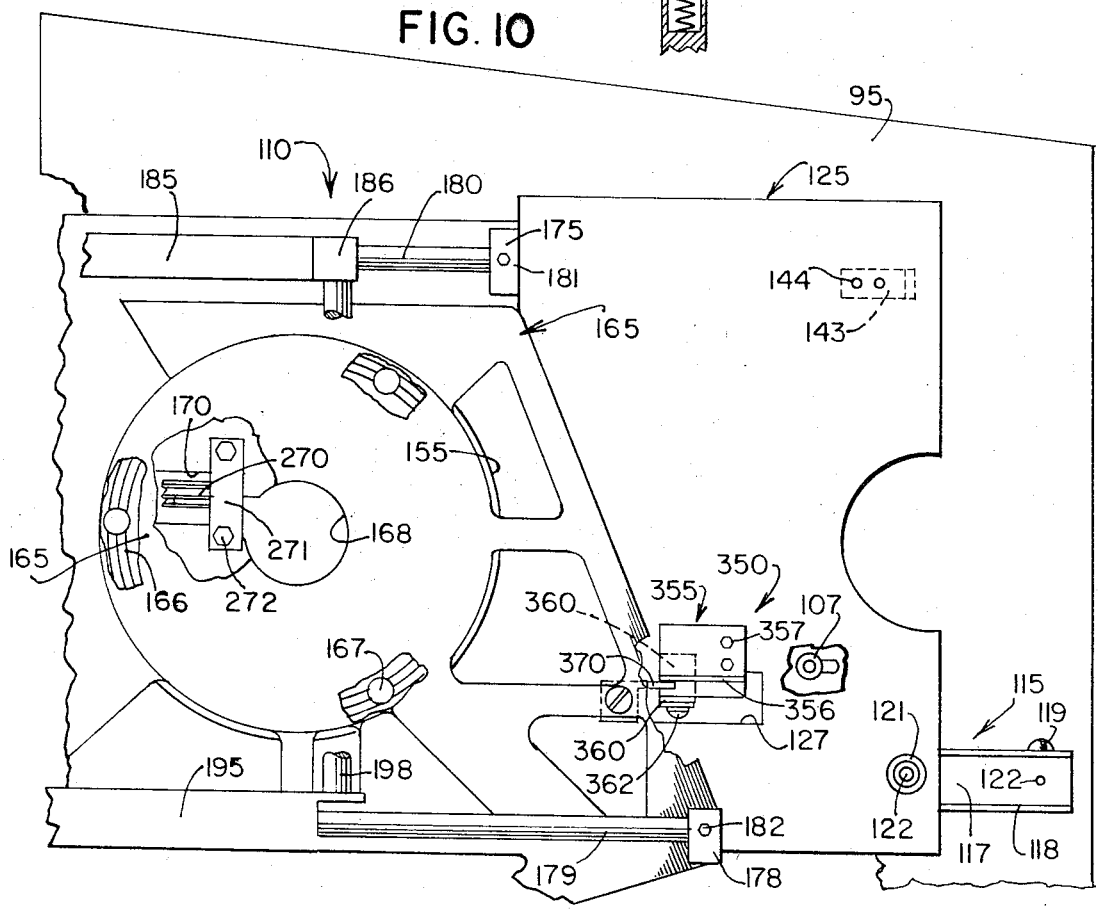

MICROIMAGE VIEWER

This invention relates to a microimage viewer for reading cards carrying photographically reduced characters. As an example, the card to be read in a reader embodying the present invention may have each unit to be read corresponding to a page of a book for example with such character units being collected in one overall field of scan. The size of each unit to be read corresponds to a page of normal type in a book. A viewer of this character makes it possible for small libraries to have a very substantial collection of book material which under normal conditions would not be within the financial resources of such a library to acquire. In addition, valuable manuscript and other material can be photographed to be read later without endangering the physical safety of the original material.

In order to obtain a high degree of condensation of space, it is necessary to stabilize the viewer against lost motion or backlash in regard to the selection of a particular unit (usually a page) being considered. In addition, it is necessary that the means for preventing relative movement between the lens system and a film card be eliminated completely so that once a reading unit, as a page, is focused properly, it will remain in focus and will additionally remain in focus even though horizontal and vertical scan movements or adjustments are provided to change the page being read. While various devices for reading cards have been available, for the most part such devices have been characterized by complexity of mechanism, inability of the mechanism to remain in adjusted position and to rotate the image and retain the image centered on the screen. While the construction embodying the present invention is adaptable for general reader use, it is particularly useful for readers having a medium to high degree of magnification. As an example, the construction hereinafter described is useful for magnification of the order of about 100, it being understood that variations in the degree of magnification are possible without departing from the invention.

Accordingly, it is an important object of the present invention to provide a microimage viewer in which a light source and a lens are utilized for projecting on a screen a magnified reproduction of a character carried on a film card positioned between the light source and the lens, the microimage viewer comprising a film card carrying means including a film card holder positioned intermediate the light source and the lens for maintaining a film card carried thereby substantially perpendicular to the optical axis of the lens and for maintaining the surface of the film card in fixed spatial relation to the lens, the film card carrying means being movable between a film card changing condition thereof wherein the film card holder is removed from between the light source and the lens to enable the film card to be changed and a film card viewing condition thereof wherein the film card holder is positioned between the light source and the lens and the film card is fixedly held substantially perpendicular to the optical axis of the lens and the film card surface is maintained at a fixed spaced relation to the lens, and means for rotating the film card carrier in the film card viewing condition thereof with respect to the lens, whereby the film card carried by the film card carrying means may be rotated while the film card is fixedly held substantially perpendicular to the optical axis of the lens and the film card surface is maintained at a fixed spaced relation to the lens so that the magnified reproduction of the character on the screen remains substantially in focus during rotation of the film card carrying means.

Another object of the present invention is to provide a microimage viewer of the type set forth in which there is provided a focusing apparatus connected to the lens for moving the lens toward and away from the film card holder so as to focus the reproduction projected on the screen by the lens, the focusing apparatus including a shaft having an eccentrically mounted pin on one end thereof journalled within an opening in the side of the lens, rotation of the shaft providing for movement of the lens toward and away from the film card.

Still another object of the present invention is to provide a microimage viewer of the type set forth in which the film card holder includes a first glass flat fixedly positioned in a frame and a second glass flat positioned in the frame and normally spring biased toward the first glass flat, the first and second glass flats being shiftable between a film card holding position thereof wherein the first glass flat and the second glass flat are urged toward each other firmly to hold the film card positioned therebetween and a film card releasing position thereof wherein the second glass flat is moved away from the first glass flat to allow the film card to be removed from between the first and the second glass flats.

A further object of the present invention is to provide a microimage viewer of the type set forth in which the magnified reproduction may be projected onto a screen connected to the housing holding the light source and the lens or the magnified reproduction may be projected onto a screen spaced away from the housing.

A still further object of the present invention is to provide a microimage viewer of the type set forth in which simple means are provided for removing the glass flats and repositioning them precisely as before.

The invention, both as to its organization and method of operation, together with further objects and advantages thereof, will best be understood by reference to the following specification taken in connection with the accompanying drawings in which:

FIG. 1 is a front perspective view of a viewer embodying the present invention;

FIG. 2 is a plan view of the card holder of the present invention;

FIG. 3 is a sectional view taken along line 3—3 of FIG. 2;

FIG. 4 is a longitudinal view partly in section of a sprocket drive for the scanning apparatus;

FIG. 5 is a sectional view taken along line 5—5 of FIG. 1;

FIG. 7 is a view partly in section showing the lock mechanism in the unlocked position thereof, the film card carrying means being free for rotation;

FIG. 8 is an enlarged view partly in section of the lens assembly and focusing apparatus;

FIG. 9 is a view partly in section showing the lock mechanism in the locked position thereof, the film card carrying means being prevented from rotating;

FIG. 10 is a plan view of the rotating mechanism and lock mechanism of the present invention;

Figure 6:
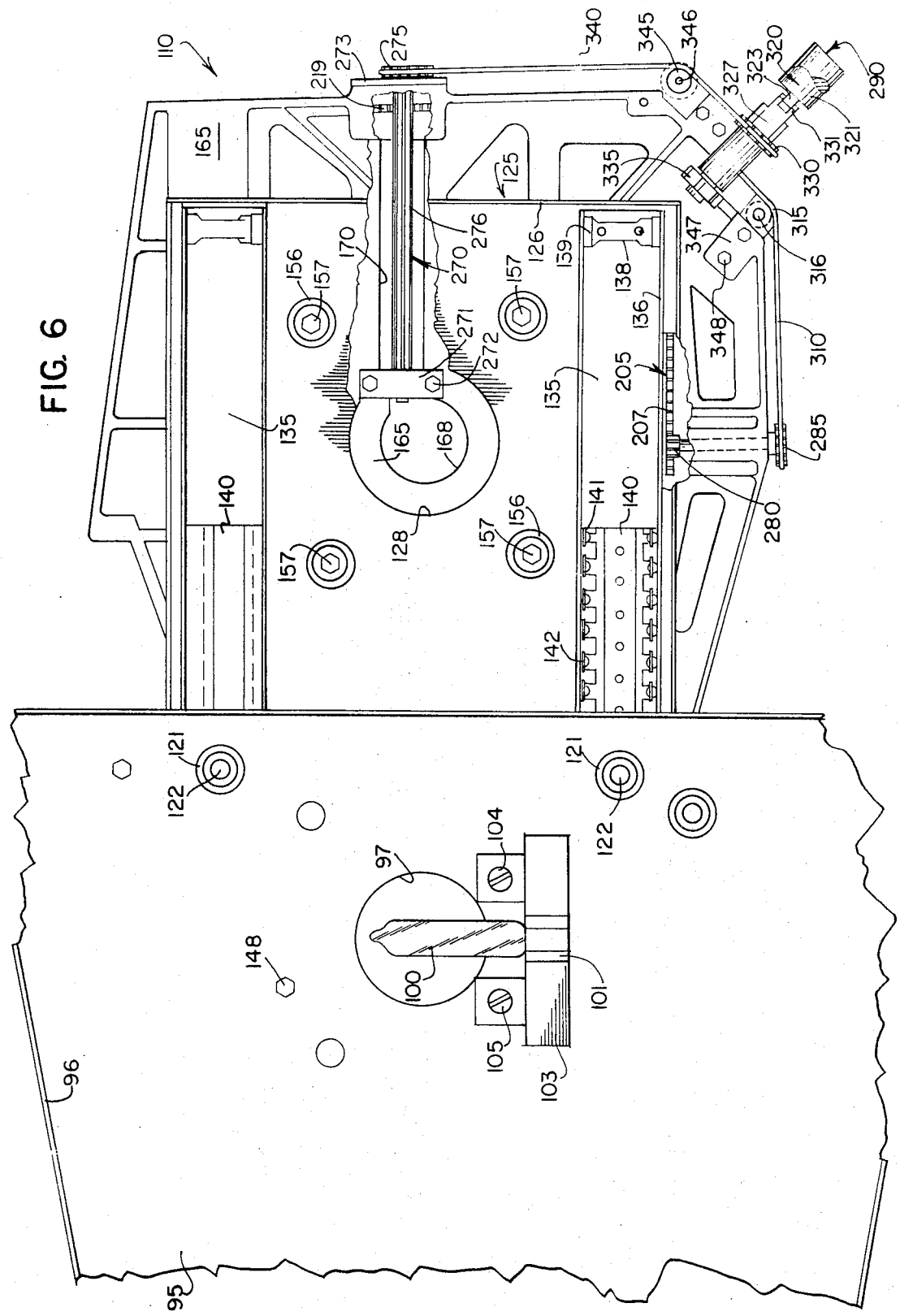
FIG. 6 is a sectional view taken along line 6—6 of FIG. 1.

Referring now to FIGS. 1–3, 5, 6 and 10, there is disclosed a microimage viewer 50 of the present invention, the microimage viewer 50 having a display screen 80 for illustrating a magnified reproduction of a film card 85. There is also shown a film card carrier 110 and card holder 210 which are positioned between a lamp 100 and a lens assembly 375 having a magnifying lens 380 therein. The microimage viewer 50 of the present invention is also provided with control knobs on the front thereof, the control knobs including an off-and-on brightness knob 120, a horizontal scanning knob 290, a vertical scanning knob 320 and a focus adjustment knob 420.

With particular reference to FIG. 1, there is disclosed the microimage viewer 50 and a housing 60 therefor, the housing 60 including a top panel 61 having an opening therein for a fan (not shown) and a bottom panel 62, the top and bottom panels 61 and 62 being angularly positioned with respect to each other. There is also provided for the housing 60 two parallel and spaced apart side panels 64 and a front panel 65 and a rear panel 66 generally parallel to the central portion of the front panel 65. The front panel 65 has an angularly extending upper portion and an angularly extending bottom portion 71 interconnected by a vertical or flat portion 72. There is further provided a screen cover 75 surrounding and protecting the screen 80 which is housed therein. The housing 60 is also provided with a fuse and lamp access door 82 located on the left-hand side panel 64 as seen in FIG. 1.

Figure 12:
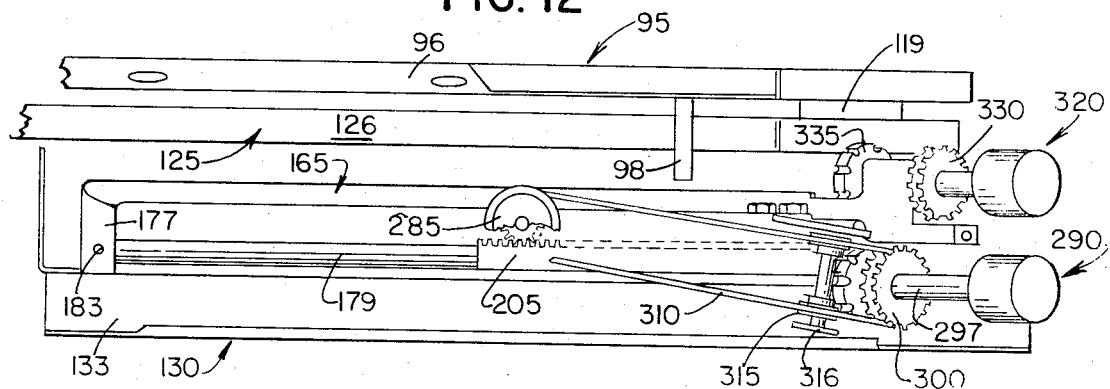
FIG. 12 is a bottom plan view of the mechanism in the present invention particularly showing the scan control device.

With reference particularly to FIGS. 1, 5, 6 and 10, there is disclosed the film card carrier frame 90 including a large front cover 91 and a handle 92. A mounting plate 95 is fixedly connected to the housing 60 and is provided with a peripheral flange 96 extending around the edges of the mounting plate 95. The mounting plate 95 has a central aperture 97 therein and has a stop 98 extending perpendicularly therefrom, as seen in FIG. 12. The lamp 100 is positioned in a socket 101 carried by a lamp mounting plate 103. The lamp mounting plate 103 is fixedly connected to the mounting plate 95 by means of two spaced apart mounting tabs 104 and screws 105 which fixedly mount the lamp mounting plate 103 to the mounting plate 95. A stop 107 is mounted on the surface of the mounting plate 95 and extends perpendicularly therefrom, the stop 107, as seen in FIG. 10, is fixedly mounted to the plate 95 by a screw and nut 108. Another stop 109 is fixedly mounted on the mounting plate 95 and extends perpendicularly therefrom, see FIG. 5. The lamp 100 is connected by means not shown to the off-on knob 120 so as to provide for control of the lamp 100 by actuation of the knob 120.

The film card carrier 110 includes a slide assembly 115 which includes a pair of inner rails 117, see FIG. 10, which are generally parallel and spaced apart and fixedly connected to the mounting plate 95 by means of a plurality of washers 121 and fasteners 122. As seen in FIG. 10, only one of the pair of inner rails 117 is shown but there are two rails each of which is connected to the mounting plate 95. Each of the pair of inner rails 117 forms opposed inner ball races 118. A spacer 119 is positioned intermediate the mounting plate 95 and each of the pair of inner rails 117.

A slide panel 125 is provided which has a peripheral flange 126 on opposed longitudinal edges thereof. The slide panel 125 is provided with a rectangular cut-out 127 and a central aperture 128, it being noted that the rectangular cut-out 127 is somewhat offset with respect to the central aperture 128 and extends therefrom. A pair of outer rails 135 each are mounted on the slide panel 125 and each provide a pair of outer ball races 136. Each of the outer rails 135 is provided with a stop member 138 on each end thereof, the stop members 138 each being provided with friction members 139. Fitting within the outer ball races 136 of each of the pair of outer rails 135 is a slide 140 which includes two opposed parallel legs 141 extending in the same direction as the outer ball races 136, the legs 141 being interconnected by a central flat portion. Each of the legs 141 carries a plurality of ball bearings 142 which rest in the respective outer ball races 136 of the outer rails 135 and also within the inner ball races 118 of the inner rails 117, thereby slidably to mount the slide panel 125 on the mounting plate 95. A camming member 143 is connected by screws 144 to the slide panel 125, as seen in FIG. 10, and is in alignment with a detent 148 provided in mounting plate 95, all for a purpose hereinafter to be explained.

There is further provided a coil spring 145 fixedly secured to the mounting plate 95 by means of a screw 146, the coil spring 145 passes over a pulley 147 rotatably mounted to the mounting plate 95 and thereafter the spring 145 is fixedly connected to the slide panel 125 by means of a screw, not shown.

A rotation ring 155 is mounted on the slide panel 125 by means of four washers 156 and screws 157, the rotation ring 155 being mounted on the side of the slide panel 125 opposite to the pair of outer rails 135. A base casting 165 fits within the rotation ring 155 and is secured thereto by means of a set screw 159. The base casting 165 has a central member having a V-track 166 which depends from the base casting 165 and fits inside the rotation ring 155. A plurality of ball bearings 167 ride between the rotation ring 155 and the V-track 166 of the base casting 165 thereby to permit rotation of the base casting 165 with respect to the rotation ring 155 which is fixedly mounted on the sliding panel 125. The central member and V-track 166 is provided with a substantially circular aperture 168 in the center thereof which is in registry with the aperture 128 in the sliding panel 125 and in registry with the aperture 97 in the mounting plate 95, thereby permitting light from the lamp 100 to penetrate through each of the aforementioned apertures. The base casting 165 further has an elongated opening 170 extending from the aperture 168 toward the edge of the base casting 165.

Referring particularly to FIGS. 5 and 6, there is shown a tab housing 175 extending perpendicularly from the base casting 165 toward the slide panel 125 and a horizontal scan shaft 180 fixedly mounted in the tab housing 175 by means of a plurality of set screws 181, the horizontal scan shaft 180 being fixedly mounted in another tab housing 176 (see FIG. 11) extending from the casting toward the slide panel 125 and spaced a suitable distance from the tab housing 175.

There is further provided on the base casting 165 a mounting tab 177 mounted on the lefthand portion of the casting as seen in FIG. 5 and extending away from the slide panel 125; additionally there is also provided another tab housing 178 on the righthand portion of the base casting 165 and also extending away from the slide panel 125. A long horizontal scan shaft 179 is fixedly mounted in the tab housings 177 and 178 by means of set screws 182 and 183.

There is also provided a support bar 185 which is slidable along the horizontal shaft 180, the support bar 185 having an end block 186 and an end block 187. A mounting block 188 extends outwardly from the support bar 185 and has a central aperture 189 therethrough which aperture receives therethrough the shaft 180 thereby to mount the support bar 185 on the shaft 180 for a sliding movement therealong. There is also provided a support bar 195 including a flange 196 and a flange 197 for purposes to be hereinafter explained.

Two vertical scan shafts 198 and 199 are provided, the vertical scan shafts 198 being fixedly connected at one end thereof to the end block 186 of the support 185 and at the other end the vertical scan shaft 198 is fixedly connected to the flange 196 of the support bar 195. The vertical scan shaft 199 is fixedly connected at one end thereof to the end block 187 of the support 185 and at the other end thereof the vertical scan shaft 199 is fixedly connected to the flange 197 of the support bar 195. It may be seen, therefore, that the combination of the horizontal scan shafts 179 and 180 and the vertical scan shafts 198 and 199 in conjunction with the support bars 185 and 195 provide for movement of the vertical scan shafts 198 and 199 along the horizontal scan shafts 179 and 180. Each of the shafts 179, 180, 198 and 199 have squared off ends which are fixedly mounted in the respective tabs by a plurality of set screws to allow for full adjustment.

A rack 205 is fixedly connected to the support bar 195 by means of screws 206, the rack 205 having a plurality of teeth 207 on one end thereof, as seen in FIG. 6, the rack 205 being for a purpose hereinafter to be explained.

The card holder 210 includes a one-piece casting having a top bar 213 and a bottom bar 214 interconnected by a side bar 215 and a side bar 216. The side bar 215 is slidable along the vertical scan shaft 198 by means of a bushing 220 and the side bar 216 is slidable along the vertical scan shaft 199 by means of a bushing 221. A rack 217 is provided on the outside of the side bar 216, as shown in FIG. 5, and is fixedly connected thereto by means of screws 218, the rack 217 having teeth 219 on one longitudinal edge thereof, see FIG. 6.

Referring to FIGS. 2 and 3, there is shown a side ledge 222 part way down the side bar 215 on which is mounted a spring 225 by means of a bolt 227. Correspondingly, on the side bar 216 there is also provided a ledge 223 on which is also mounted a spring 226 by means of a bolt 228.

A back glass flat 230 is provided which extends substantially to the side bars 215 and 216, the portions of the glass flat 230 near the side bars 215 and 216 being identified as edges 231. A front glass flat 235 is provided which has a smaller width than the back glass flat 230 so that portions 231 of the back glass flat 230 extend beyond the front glass flat 235. The front glass flat 235 has beveled edges 236 and cut-outs 237 on the top edge thereof. As seen in FIG. 3, a pin 240 extends from the bottom bar 214 of the card holder 210, the pin 240 being spaced a short distance from the back of the back glass flat 230 which normally rests on the springs 225 and it is urged thereby against the top glass flat 235.

A clip 245 is provided, the clip 245 being fixedly secured to the bottom bar 214 as by screws 246, the clip 245 extending over the beveled edge 236 of the top glass flat 235, and having a protrudence 248 extending therefrom, for a purpose hereinafter to be explained. The clip 245 urges the glass flat 235 under two tabs 250 provided at the top bar 213 of the one piece casting, each of the tabs 250 being firmly held in the casting by means of screws 251. As may be seen in FIG. 2, there are provided two small shelves 253 adjacent the tabs 250 so that the front glass flat 235 may rest thereon, the other end of the glass flat 235 resting on the bottom bar 214 of the card holder 210.

There is also provided a load bar 255 including an L-shaped member 256 having a leg 257, as shown in FIG. 3, extending generally perpendicular to the glass flats 230 and 235. The leg 257 of the L-shaped member 256 has an aperture 258 therein through which extends the protrudence 248 of the clip 245, all for a purpose hereinafter to be explained. The load bar 255 further includes two generally parallel and spaced apart side pieces 260, each of the side pieces 260 has end flange 261 which is firmly connected to the leg 257 of the L-shaped member 256. Each of the legs 260 have an indent 262 approximately midway along the length thereof, the indent 262 contacting the edges 231 of the back glass flat 230 which extends beyond the front glass flat 235. Each of the side pieces 260 has formed at the end thereof away from the end flange 261, a slot 265, as seen in FIG. 3. Each of the slots 265 extends at an acute angle toward the end of the side bar 262. The width of the slot is selected to fit around a pin 267 extending from the side bars 215 and 216, thereby shiftably to mount the load bar 255 on the card holder 210.

Referring now to FIGS. 5, 6 and 10, there is shown a pinion 270 rotatably mounted at one end thereof in the support 271 which is fixedly mounted to the base casting 165 by means of screws 272. The other end of the pinion 270 is supported for rotation in an adjustable support 273 formed of the base casting 165 and firmly held therein by an end plate and screw assembly 274. A gear 275 is mounted at the end of the pinion 270 for rotation therewith. The pinion 270 includes a plurality of teeth 276 extending the length thereof, which teeth 276 are in meshing relationship with the teeth 219 on the rack 217, all for a purpose hereinafter to be explained. There is also provided a pinion 280 having teeth 286 extending therealong, the pinion 280 being housed for rotation in a bore 281 formed in the base casting 165. The pinion 280 has a gear 285 fixed at one end thereof for rotation therewith, the pinion 280 being journalled for rotation in a member depending from the base casting 165.

With reference particularly to FIGS. 4, 5, 6, 11 and 12, there is disclosed in detail the horizontal knob assembly 290 including a knob 291 which is generally circular in shape and hollow and has an inner cone surface 292. A tongue 293 extends from the right-hand edge of the knob 291 as seen in FIG. 4. A bore 295 extends through the center of the knob 291. There is further provided an elongated shaft 297 having a bore 298 extending therethrough, the left-hand end of the bore 298 being in communication with a chamber 299 within the shaft 297, all as seen in FIG. 4. A sprocket 300 is journalled on the shaft 297 for rotation therewith. A groove 301 is cut within the shaft 297 for receiving the tongue 293 of the knob 291, see FIG. 5. A cone clutch 302 is positioned within the knob 291 and has extending therefrom a shaft 303 which extends through the bores 295 and 298 hereinbefore described. At the distal end of the shaft 303 is a detent cam 305. A spring 307 is located in the chamber 299 and surrounds the shaft 303 and also fits within the tongue 293, thereby biasing the knob 291 away from the shaft 297 normally to cause contact between the inner surface 292 of the knob 291 and the cone clutch 302. In the normal relationship, therefore, the cone clutch 302 will rotate upon rotation of the knob 291, thereby to cause the sprocket 300 and the detent 305 simultaneously to rotate. As may be seen, pressure on the knob 291 causing the spring 307 to be compressed will enable the shaft 297 and the sprocket 300 to rotate without corresponding rotation of the detent cam 305 and cone clutch 302, all for a purpose hereinafter to be explained. A belt 310 is positioned around the sprocket 300 of the horizontal knob assembly 290, the belt 310 passing around a pair of idler wheels 315 which are supported on a shaft 316 which has an adjustable center and depends from a support 317 fixedly mounted on the base casting 165 by screws 318. The belt 310 extends around the gear 285 thereby drivably to connect the horizontal knob assembly 290 with the gear 205 and pinion 280.

There is further provided a vertical knob assembly 320, which knob assembly is identical in construction to the horizontal knob assembly 290. The vertical knob assembly 320 includes a knob 321 having a tongue 323 extending therefrom. A sprocket 330 is suitably journalled on a shaft 327, the shaft 327 having a groove 331 therein. At the other end of the shaft 327 is a detent cam 335, all for a purpose hereinafter to be explained. There is further provided a belt 340 which passes around the sprocket 330 and thereby is contacted by a pair of idler wheels 345 mounted for rotation about a shaft 346, which shaft 346 which has an adjustable center and is supported by a support member 347 mounted to the base casting 165 by screws 348. It is seen, therefore, that the vertical knob assembly 320 is drivably connected to the gear 275 on the end of the pinion 270 and thereby to the rack 217.

Referring now to FIGS. 5, 7 and 9 there is disclosed a lock mechanism 350 which includes the stop member 107 fixedly mounted to the mounting plate 95 and a rotation lock assembly 355. The rotation lock assembly 355 includes a plate 356 extending through the aperture 127 so as to extend above and below the slide panel 125, the plate 356 being fixedly connected to the slide panel 125 by means of a mounting plate 358 and screws 357. A movable lock bracket 360 is mounted on the mounting plate 358 and is rotatable with respect thereto by means of a screw and washer assembly 362 and 361. The lock bracket 360 is parallel to but spaced apart from the plate 356, for a purpose hereinafter explained.

A spring 365 is fixedly connected at one end 366 thereof to the lock bracket 360 and at the other end 367 thereof the spring 365 is fixedly connected to the plate 356, thereby normally to bias the rotating lock bracket 360 in the position shown in FIG. 9. A flange 370 is mounted on the base casting 165 and extends perpendicularly therefrom and is positioned so as to lie between the lock bracket 360 and the plate 356. As may be seen, from FIG. 7, when the slide panel 125 is moved into position where the stop 107 contacts the lock bracket 360 so as to rotate the same about the screw 362, the lock bracket 360 pivots to allow the flange 370 to pass it by and rotate with respect thereto.

Figure 13:
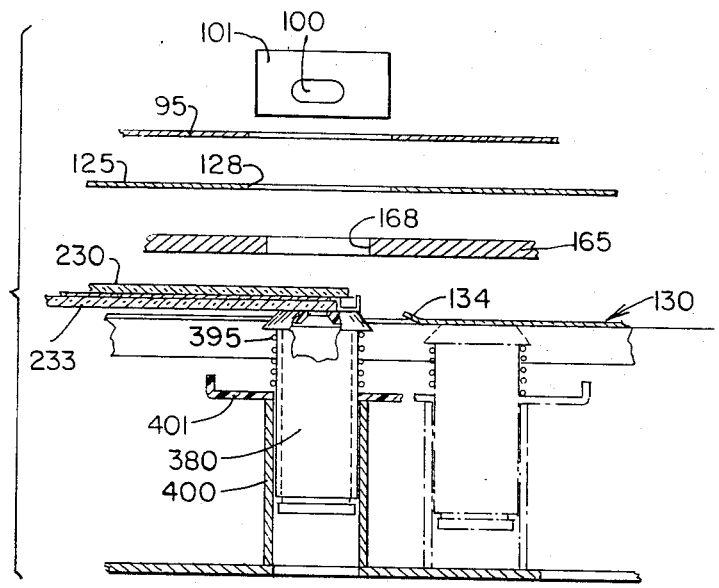
FIG. 13 is a fragmentary top view partly in section showing the relationship between the lamp and the lens assembly when the film card carrying means is in the film card viewing condition thereof and in the film card changing condition thereof.

With reference to FIGS. 8 and 13, there is disclosed the lens assembly 375 including a lens 380 having a hole 381 in the side thereof. The lens 380 is mounted within a lens housing 385, which housing 385 has a cap 386. The housing cap 386 extends beyond the periphery of the lens housing 385 and has a beveled front face 387. At the center of the lens cap 386 and particularly at the center of the beveled front face 387 there is an aperture 388 extending through the lens cap so as to provide communication between the outside of the lens cap and the inside of the lens cap. There is also provided a thin, flat annular portion 389 having a small diameter immediately surrounding the aperture 388, the beveled portion 387 of the cap 386 extending from the end of the flat portion to the edges of the cap 386. The lens 380 is maintained within the lens housing 385 by means of a rear stop cap 392 positioned within the other end 391 of the lens housing 385. Further, an aperture 393 is provided in the side of the lens housing 385, which aperture 393 is in registry with the hole 381 in the side of the lens 380 when the lens 380 is in position inside of the lens cap 386.

There is also provided a cylindrical lens support 400 for receiving the lens housing 385, the lens support 400 being securely fastened to a support plate 401 which in turn is securely fastened to the housing 60. The lens support 400 has a slot 402 therein, which slot is in registry with the aperture 393 in the lens housing 385 and the hole 381 in the lens 380. A spring 395 is positioned intermediate the support plate 401 and the end of the cap 386 extending beyond the side wall of the lens housing 385, thereby to urge the lens housing 385 and the lens 380 carried therein away from the support plate 401 and toward a cover plate 130 or glass flat 235.

Figure 11:
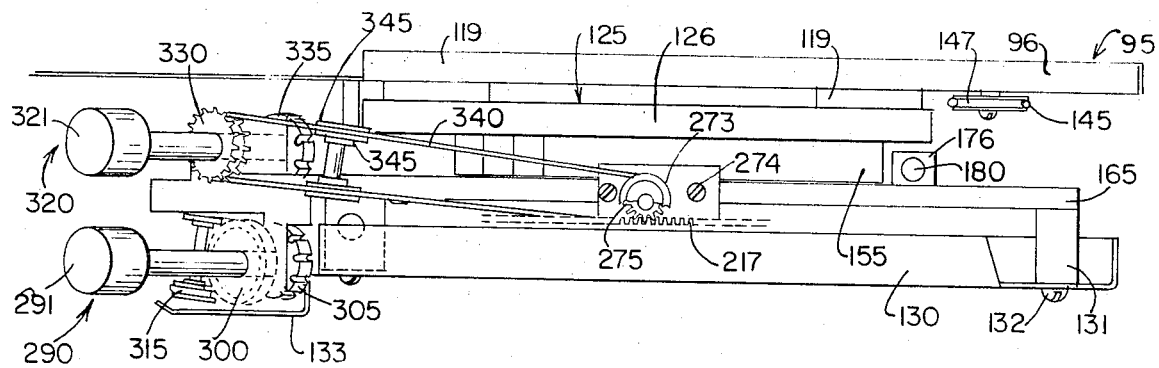
FIG. 11 is a front end view of the mechanism of the present invention particularly showing the scan control device.

With reference particularly to FIGS. 11–13, the cover 130 is shown mounted on a tab 131 by means of a screw 132, the cover plate 130 having a flange 133 extending over the horizontal knob assembly 290 and particularly over the belt 310. The cover plate 130 also includes a flange 134 which in use extends toward the plane formed by the front glass flat 235 and acts as a camming surface for the lens housing 385, all for a purpose hereinafter to be explained.

Referring now to FIG. 8 there is disclosed a focus shaft 405 having a small round shaft 406 joined to a larger diameter round shaft 407, the smaller diameter round shaft 406 terminating in a square shank 409 and the larger diameter round shaft terminating in a frusto conical portion 410 having an eccentrically mounted cone tip or pin 411 extending therefrom. In use, as seen in FIG. 8, the eccentrically mounted cone tip 411 fits into the hole 381 in the side of the lens 380, the hole 381 being slightly deeper than the conical tip 411, for a purpose hereinafter to be explained. Further, it is to be noted that the aperture 393 in the lens housing 385 is of such a diameter snugly to fit against the frusto conical portion 410 while the slot 402 in the side of the lens support 400 is of a longer longitudinal dimension and will accommodate movement of the focus shaft 405 as well as the lens housing 385 and the lens 380 in a longitudinal direction up and back along the slot 402.

At the other end of the focus shaft 405, the square fitting 409 is received within a square hollow shaft 415 which hollow shaft 415 has therewithin a chamber in which is positioned a spring 416, thereby to urge the shaft 405 and hence the conical tip or pin 411 into the hole 381 in the side of the lens 380. The other end of the square shaft 415 is connected to the focus knob 420, the focus knob 420 containing a gear reduction mechanism (not shown) whereby ten turns of the focus knob 420 results in one complete rotation of the frusto conical portion 410 and hence the cone tip 411 of the focus shaft 405. It is noted that the square end 409 of the focus shaft 405 is slightly smaller than the square hollow shaft 415 thereby to allow some movement of the focus shaft 405 within the square hollow shaft 415, such as in a universal joint, for a purpose hereinafter to be explained.

The operation and use of the microimage viewer 50 will now be explained. In the preferred embodiment of the present invention, the film card 85 comprises a film laminated between two sheets of plastic, the film carrying a plurality of characters arranged in rows and columns. It is to be understood that for the film card 85 there may be substituted a glass having a biological specimen deposited thereon or any microscopic object on a suitable carrier, it being intended that the term "film card" in the specification and claims of this application include all such examples. Further, in the preferred embodiment of the present invention, a lens having a 90 power magnification was used; however, it is contemplated that lenses having magnification powers of anywhere from 25 to 250 may be substituted in the present invention without any altering of the structure whatever. Additionally, when the microimage viewer 50 is used as a projector, wherein the screen 80 is removed from the housing 60 and positioned at a distance from the viewer 50, the magnification of the character carried on the film card 85 may be over 1,000, the character magnification being a function of the distance between the screen and the reflecting mirrors used in the viewer. It is to be understood that the microimage viewer 50 of the image from the lens 380 to the screen 80, all as is well known in the art. When the screen 80 is placed in the housing 60, a rear illuminating type screen is used; however, when the screen 80 is spaced from the housing 60, then either a front or a rear illuminating type of screen can be used, all as is well known in the art.

The microimage viewer 50 of the present invention may be plugged into any normal 120 volt socket, the lamp 100 being turned on by rotation of the off-on knob 120. The off-on knob 120 is also a three-position brightness switch with which the candle power of the lamp 100 may be increased by successive rotation thereof. The fuse and lamp access door 82 may be used to service the lamp, 100.

As is shown in FIGS. 1, 5 and 10, the film carrier 110 is in the film card viewing condition thereof, that is the slide panel 125 is in the fully retracted position with respect to the mounting plate 95 wherein the film card holder 210 is intermediate the lamp 100 and the lens 380. By grasping the handle 92 and pulling away from the front panel 70 of the housing 60, the film card carrier 110 may be moved from the film card viewing condition thereof or the fully retracted position to the film card changing condition thereof or the fully extended position, as illustrated in FIG. 6. Movement of the film card carrier 110 from the film card viewing condition thereof to the film card changing condition thereof is facilitated by the slide assembly 115, the camming member 143 cooperating with the detent 148 to maintain the film card carrier 110 in the film card changing condition thereof. When the film card carrier 110 is in the film card changing condition thereof, the lens assembly 375 and particularly the flat annular portion 389 of the lens housing cap 386 is in contact with the cover plate 130, as best seen in FIG. 13, the cover plate 130 having moved to the position shown in the right-hand portion of FIG. 13 when the film card carrier 110 is moved to the film card changing condition thereof. The flange 134 acts as a camming surface so as to prevent damage to the lens housing 385 and lens 380 contained therein.

When the film card carrier 110 is in the film card changing condition thereof, a film card 85 may be introduced into the card holder 210. As is shown in FIGS. 2 and 3, the film card holder 210 is in the film card holding position thereof wherein the springs 225 and 226 urge the back glass flat 230 toward the front glass flat 235. Movement of the card holder 210 from the film card holding position thereof to the film card releasing position thereof if effected by depressing the load bar 255. Depressing the load bar 255 causes the indents 262 on the side pieces 260 to contact the edges 231 of the back glass flat 230 which extend beyond the front glass flat 235, thereby causing the glass flat 230 to move away from the glass flat 235. As the back glass flat 230 is moved away from the front glass flat 235, the glass flat 230 contacts the pin 240 and cams away from the glass flat 235 at the edge of the glass flats away from the clip 245. The back glass flat 230 normally does not contact the pin 240 but only contacts the pin 240 when the card holder 210 is moved from the film card holding position thereof to the film card releasing position thereof.

When the card holder 210 is in the film card releasing position thereof, the front glass flat 235 has not moved from its position when the card holder 210 was in the film card holding position thereof, the glass flat 235 being firmly held in its position by means of the clip 245, the tabs 250 and the shelves 253 as well as the bottom bar 214 of the one piece casting forming the card holder 210. When the card holder 210 is in the film card releasing position thereof, a film card 85 may be inserted between the back glass flat 230 and the front glass flat 235 and centered with respect to the same. Release of the load bar 255 permits the back glass flat 230 to move to its normally biased position in which it is urged by the springs 225 and 226 firmly against the film card 85, thereby firmly holding the film card 85 between the front glass flat 235 and the back glass flat 230.

The clip 245 serves two purposes. Firstly, the clip 245 serves to maintain the front glass flat 235 in position firmly abutted against the tabs 250. Secondly, the protrudence 248 of the clip 245 extends through the aperture 258 in the load bar 255 thereby to prevent unwanted movement of the load bar 255 away from the film card holder 210. When the load bar 255 is mounted as shown, it is shiftable about pins 267 and moves only a small distance, that is enough to cause the back glass flat 230 to move away from the front glass flat 235. When it is desired to dismantle the glass flats 230 and 235 to clean the same, the load bar 255 may be removed by depressing the protrudence 248 until the load bar 255 clears the same; thereafter, it is a simple matter to remove the load bar 255 from the pins 267 and then remove the front glass flat 235 by either removing the screws 251 or by moving the clip 245 away from the glass flat 235. Once the front glass flat 235 has been removed, the back glass flat 230 is easily removed as it only rests on the springs 225 and 226. After the glass flats 230 and 235 have been cleaned, they may be returned by reversing the procedures above. The preferred method of removing the glass flats 230 and 235 is to move the clip 245 rather than remove the screws 251; in this manner, the glass flat 235 can be replaced in the precise position from which it was removed.

Preferably, a film card 85 is introduced into the film card holder 210 only when the film card holder is positioned in the upper left hand corner of the film card carrier 110, refer to FIG. 5 for the general directions, however, the film card holder 210 is not in the upper left hand corner in the figure. Movement of the film card holder 210 horizontally or vertically is effected by means of the horizontal knob assembly 290 or the vertical knob assembly 320. As may be seen most easily in FIGS. 5 and 6, the film card holder 210 may be moved horizontally by rotating the horizontal knob assembly 290 and particularly the knob 291, which rotation results in movement of the sprocket 300 and thereby the belt 310 and the sprocket 285. The sprocket 285 is operatively connected to the pinion 280, rotation thereof resulting in movement of the rack 205 and hence the film card holder 210 to which the rack 205 is attached by means of the bolts 206. Since each of the support bars 185 and 195 are slidable with respect to the shafts 179 and 180, rotation of the knob 291 results in horizontal movement of the film card holder 210 along the shafts 179 and 180.

Normally, horizontal movement of the film card holder 210 is incremental due to a detent (not shown) which cooperates with the detent cam 305 so as to provide for incremental movement. The purpose of the incremental movement is to provide page by page movement of the film card holder 210 past the lens 380 when the film card 85 contains a plurality of characters arranged in rows and columns. The detent cam 305 may be disengaged by comprising the spring 307 to allow for adjustment of the character on the film card 85 within the metes and bounds of the screen 80. After the character has been centered on the screen 80, release of the knob 291 results in engagement with the cam 302 thereby to activate the detent cam 305 and provide for incremental movement of the film card holder 210 along the shafts 179 and 180.

Operation of the vertical knob assembly 320 is the same as the horizontal knob assembly 290, rotation of the knob 321 resulting in incremental movement of the pinion 270 and the rack 217 thereby to move the film card holder 210 vertically along shafts 198 and 199, the side bars 215 and 216 each containing respectively bearings 220 and 22! which provide for sliding movement of the film card holder 210 along the shafts 198 and 199. As may be seen therefore, actuation of the horizontal knob assembly 290 and the vertical knob assembly 320 results in vertical and horizontal movement of the film card holder 210 along the shafts 198 and 199 and along shafts 179 and 180. The idler wheels 315 and 345 respectively provide a tension adjustment by means of the adjustable centers of shafts 316 and 346 for the belts 310 and 340 to assure the proper tension therein which operatively connect the sprockets with the racks and pinions.

Due to the mounting of the central member having the V-track 166 in the rotation ring 155 and the presence of the ball bearings 167, the base casting 165 is rotatable with respect to the slide panel 125, the presence of three ball bearings 167 maintaining the base casting 165 in the same plane during rotation thereof. Rotation of the base casting 165 and hence the card holder 210 when the film carrier 110 is in the film card changing condition thereof is prevented by the lock mechanism 350 illustrated in FIGS. 5, 7, 9 and 10. As was previously disclosed, the lock bracket 360 is spring biased to the position shown in FIG. 9 and when the film card carrier 110 is in the film card changing condition thereof the lock mechanism is in the position shown in FIG. 9.

As disclosed in FIG. 9, the flange 370 depending from the base casting 165 is positioned between the lock bracket 360 and the plate 356 of the rotation lock assembly 355, which plate 356 extends through the aperture 127 in the slide panel 125. Because the flange 370 is positioned between the lock bracket 360 and the plate 356 rotation of the base casting 165 is prevented with respect to the slide panel 125. When the film card carrier 110 is moved from the extended position shown in FIG. 6, that is the film card changing condition thereof, to the retracted position shown in FIG. 5, that is the film card viewing condition thereof, the lock mechanism 350 changes from the position shown in FIG. 9 to the position shown in FIG. 7.

In FIG. 7, the lock mechanism is shown in the unlocked position thereof wherein the lock bracket 360 has come into contact with the stop 107 fixedly mounted on the mounting plate 95. Upon contact of the lock bracket 360 with the stop 107, the lock bracket 360 is moved out of its normally biased position to the position shown in FIG. 7, wherein the lock bracket 360 is moved out of alignment with the flange 370 thereby to allow rotation of the base casting 165 with respect to the slide panel 125. The base casting 165 is free to rotate 90° until the flange 370 contacts the stop 109 fixedly mounted on the mounting plate 95. A detent ball (not shown) in the V-track 166 serves to retain the base casting 165 at the angular extremes of its field of rotation.

Rotation of the film card holder 210 with the base casting 165 is a desirable and an important feature of the present invention because the film card 85 may contain characters in various orientation. By rotating the base casting 165 and thereby the film card holder 210, the correct orientation of the character on the film card may always be presented on the screen 80. Another important feature of the present invention is that the character on the screen 80 remains in focus during rotation of the base casting 165 and the film card holder 210. This feature is effected by the combination of several factors.

Focus of the character on the screen 80 during rotation of the film card carrier 110 and the card holder 210 is maintained in part by the fact that the back glass flat 230 and the front glass flat 235 tightly hold the film card 85 therebetween to maintain a fixed spaced relationship between the film card 85 and the lens 380. Additionally, because the plane of the film card 85 is parallel to the rotation ring 155 the film card 85 remains in a plane perpendicular with respect to the optical axis of the lens 380 during rotation of the film card. Further, the distance between the film card 85 and the lens 380 is maintained the same during the rotation of the film card carrier 110 because the lens assembly 375 and particularly the small diameter flat annular portion 389 abuts and is in contact with the front glass flat 235 when the film card carrier 110 is in the film card viewing condition thereof.

As may be seen from the left-hand illustration in FIG. 13, the lens assembly 375 abuts the glass flat 235 when the film card carrier 110 is in the film card viewing condition thereof. Rotation of the film card carrier 110 will not result in any substantial spatial movement of the film card 85 with respect to the lens assembly 375. Contact of the lens assembly 375 with the glass flat 235 is assured by means of the spring 395 positioned between the support 401 and the lens housing cap 386 continually to urge the lens housing cap 386 against the glass flat 235. Particularly, only the small diameter flat annular portion 389 of the lens housing cap 386 is in contact with the glass flat 235. This important feature of the present invention is to minimize the effect of variations in the glass flat 235 on the focus of the character appearing on the screen 80 during rotation of the film card carrier 110. Because the annular portion 389 is small, imperfections in the glass flat 235 a small distance away from the contact area of the glass flat and the annular portion 389 will not affect the focus of the character being reproduced on the screen 80.

Another reason that the character on the screen remains in focus during rotation of the film card carrier 110 is that in addition to the fact that the film card 85 remains in a plane perpendicular to the optical axis of the lens 380, as hereinbefore explained, the arrangement of the lens 380, the focus shaft 405 and the lens housing 385, prevents the lens 380 from moving along its optical axis with respect to the front glass flat 235 and the film card 85, thereby maintaining the image on the screen 80 in focus.

Since the focus shaft 405 is continually urged toward the lens 380 and particularly the cone tip 411 is forced within the hole 381, the lens 380 is fixed against movement along its optical axis with respect to the lens housing 385. Since there are some mechanical vibrations introduced into the housing 60 upon rotation of the film card carrier 110, the fact that the lens 380 is prevented from moving along its optical axis is important in maintaining the image on the screen 80 in focus. An important feature in this respect is that the hole 381 is slightly deeper than the cone tip 411, whereby the spring 416 urges the cone tip 411 into engagement with the sides of the hole 381 thereby wedging the conical tip 411 of the focus shaft 405 against the lens 380.

When manual adjustment of the focus shaft 405 is necessary to refocus the image on the screen 80, the 10:1 ratio in the focus knob assembly 420 permits fine focusing of the image. As the focus knob assembly 420 is rotated, the focus shaft 405 also rotates and therefore so does the frusto conical portion 410 and the cone tip 411 mounted thereon. Movement of the lens 380 along its optical axis is provided by the movement of the eccentrically mounted cone tip 411, it being understood that the lens 380 moves along its optical axis only about one-sixteenth inch and that a small amount of rotation is imparted thereto by rotation of the cone tip 411. The universal action of the square shank 409 and the square shaft 415 permits the focus shaft 405 to follow the lens housing 385 as the lens housing moves along the optical axis of the lens 380.

The slot 402 in the lens support 400 limits longitudinal movement of the lens 380 and the lens housing 385 together so as to prevent the lens 380 and lens housing 385 from moving too far away from the support plate 401 when the glass flats 230 and 235 are not in place. Usually, when the glass flats 230 and 235 are removed for cleaning the film card carrier 110 is in the film card changing condition thereof so that the lens housing 385 is in contact with the cover 130 which limits movement of the lens housing 385 away from the support plate 401. However, if by error the film card carrier 110 is moved to the film card viewing condition thereof the lens housing 385 and the lens 380 contained therein would be free to move away from the support plate 401 and into the aperture 168 in the base casting 165, thereby jamming the film card carrier 110 in the film card viewing condition thereof. The slot 402 in the lens support 400 limits the longitudinal movement of the lens housing 385 and the lens 380 along the optical axis of the lens to prevent such jamming of the mechanism.

The lens cap 386 and its construction is also important, as stated above, in maintaining the image or character on the screen in focus during rotation of the film card carrier 110. An important requirement for the housing cap 386 is that it be made from a material which withstands the continued wear of the glass flat 235 rubbing against the flat annular portion 389 which is in contact with the glass flat 235 when the film card carrier 110 is in the film card viewing condition thereof. The lens housing cap 386 is preferably made of "Delrin" produced by the DuPont Company, the "Delrin" material being a synthetic organic plastic resin having a low coefficient of friction for both metal and glass and being abrasion resistant and wear resistant so as not to wear off on the glass flat 235 resulting in degraded images.

Another feature of this invention is that the image on the screen 80 remains in focus not only during rotation of the card holder 210 but also during scanning along substantially the entire surface area of the film card 85. This feature is effected by maintaining the film card 85 in a plane substantially perpendicular to the optical axis of the lens 380 during the scan movements provided by the horizontal knob assembly 290 and the vertical knob assembly 320. The positioning of the film card 85 in a plane perpendicular to the optical axis of the lens 80 is in part accomplished by the fact the film card holder 210 includes a one-piece casting including the side bars 215 and 216 which are slidable with respect to the vertical scan shaft 198 and 199. Also, the support bars 185 and 195 which fixedly hold the vertical scan shafts 198 and 199 therebetween are slidably mounted on the horizontal scan shafts 179 and 180 which are fixedly mounted to the one-piece base casting 165. Total construction of the film card carrier 110 is sturdy and remains in alignment once the plane formed between the glass flats 230 and 235 is aligned to be parallel to the plane of rotation and to be perpendicular with the optical axis of the lens 380.

Alignment of the glass flats 230 and 235 and more particularly the plane formed therebetween with the optical axis of the lens 380 is effected by optical techniques well known in the art and is aided by the fact that the mounting holes in the tab housings 175, 176, 177, and 178 as well as the mounting holes in the ends 186, 187 and 196 and 197 are somewhat larger than the associated shafts 179, 180, and 198 and 199, thereby to allow some movement of the shafts within the respective mounting blocks before the shafts are fixedly secured therewithin. Further, it is imperative that the pinion 270 be aligned so that the image projected on the screen 80 remains vertically centered during horizontal scanning along the pinion 270.

The coil spring 145 is provided to counterbalance the weight of the film card carrier 110 because the housing 60 of the microviewer 50 normally is tilted at an angle with respect to the horizontal. It may be additionally elevated by means of legs (not shown) so as to position the screen 80 in a more comfortable reading position with respect to an individual using the microviewer 50. The legs may be adjustable so as to position the microviewer 50 at various angles with respect to the horizontal, all this being well known in the art.

In view of the foregoing, it is apparent that there has been provided a microviewer of the type in which the film card is positioned in a vertical plane perpendicular to the optical axis of the lens, the film card being rotatable with respect to the lens, and the microviewer is adapted to be used with the screen positioned in the housing or spaced therefrom. While there has been described what is at present considered to be the preferred embodiment of the invention, it will be understood that various modifications may be made therein and it is intended to cover in the appended claims all such modifications as fall within the true spirit and scope of the invention.

What is claimed is:

1. A microimage viewer in which a light source and a lens are utilized for projecting on a screen a magnified reproduction of a character carried on a film card positioned between the light source and the lens, said microimage viewer comprising a film card carrying means including a film card holder positioned intermediate the light source and the lens for maintaining a film card carried thereby perpendicular to the optical axis of the lens and for maintaining the surface of the film card in fixed spatial relation to the lens, said film card carrying means being movable between a film card changing condition thereof wherein said film card holder is removed from between the light source and the lens to enable the film card to be changed and a film card viewing condition thereof wherein said film card holder is positioned between the light source and the lens and the film card is fixedly held perpendicular to the optical axis of the lens and the film card surface is maintained at a fixed spaced relation to the lens, and means for rotating said film card carrier in the film card viewing condition thereof with respect to the lens, whereby the film card carried by said film card carrying means may be rotated while the film card is fixedly held perpendicular to the optical axis of the lens and the film card surface is maintained at a fixed spaced relation to the lens so that the magnified reproduction of the character on the screen remains in focus during rotation of said film card carrying means, and further comprising a scanning apparatus connected to said film card carrying means for moving said film card holder horizontally and vertically with respect to the lens while the film card is maintained perpendicular to the optical axis of the lens and the surface of the film card is in fixed spaced relation to the lens, said scanning apparatus being operable to position substantially the entire surface area of the film card between the lens and the light source for viewing on the screen for any desired angle of rotation of said film card carrier, and wherein said scanning apparatus includes a first rack fixedly connected to said film card holder, a second rack fixedly connected to said film card holder and perpendicular to said first rack, a first pinion rotatably mounted on said film card carrier and in engagement with said first rack, a second pinion rotatably mounted on said film card carrier perpendicular to said first pinion and in engagement with said second rack, and first and second actuating means respectively connected to said first and second pinions for rotating the same and thereby moving said first and second racks with respect to the lens, thereby effecting movement of a film card carried by said film card holder horizontally and vertically with respect to the lens, and wherein each of said actuating means includes a conical clutch and sleeve assembly constructed to permit incremental movement of the associated rack along the associated pinion as well as continuous movement of the associated rack along the associated pinion.

2. A microimage viewer comprising a housing, a light source fixedly mounted in the housing, a lens assembly including a lens mounted in said housing and a screen positioned in said housing so as to illustrate a magnified reproduction of a character carried on a film card positioned between said light source and said lens projected onto said screen by said lens, a film card carrying means including a film card holder positioned intermediate said light source and said lens assembly for maintaining a film card carried thereby perpendicular to the optical axis of said lens and for maintaining the surface of the film card in fixed spatial relation to said lens, said film card carrying means being movable between a film card changing condition thereof wherein said film card holder is removed from between said light source and said lens to enable the film card to be changed and a film card viewing condition thereof wherein said film card holder is positioned between said light source and said lens and the film card is fixedly held perpendicular to the optical axis of said lens and the film card surface is maintained at a fixed spaced relation to said lens, means for rotating said film card carrier in the film card viewing condition thereof with respect to said lens, said lens assembly being continually urged toward said film card carrying means so as to contact said film card holder when said film card carrying means is in the film card viewing condition thereof, and a focusing apparatus connected to said lens for moving said lens toward and away from said film card holder so as to focus the reproduction projected on said screen by said lens, said focusing apparatus including a shaft having an eccentrically mounted pin on one end thereof journalled within an opening in the side of said lens, said shaft being positioned generally transversely to the optical axis of said lens and being continually urged toward said lens firmly to position said eccentrically mounted pin on the end of said shaft in the opening in said lens, rotation of said shaft providing movement of said lens toward and away from the film card so as to focus the reproduction projected on said screen by said lens, whereby the film card carried by said film card carrying means may be rotated while the film card is fixedly held perpendicular to the optical axis of said lens and the film card surface is maintained at a fixed spaced relation to said lens so that the magnified reproduction of the character on said screen remains in focus during rotation of said film card carrying means, and wherein said lens assembly includes a cylindrical lens support having a slot in one side thereof, a lens housing mounted inside said lens support and slidable therewith, said lens housing having an aperture in the side thereof and having a beveled cap at one end thereof, a spring positioned between said beveled cap of said lens housing and one end of said lens support for continually urging said lens housing away from said lens support, said lens being positioned inside said lens housing with the opening in the side thereof being in registry with the aperture in said side of said housing and said slot in said lens support, whereby said focusing apparatus may be positioned within said slot and said aperture in said lens housing and said opening in the side of said lens so as to provide upon rotation thereof movement of said lens toward and away from the film card, said slot limiting longitudinal movement of said lens housing away from said lens support.

3. The microimage viewer set forth in claim 2, wherein said beveled lens housing cap has an aperture in the center thereof surrounded by a flat annular portion which in use contacts said film card holder when said film card carrying means is in the film card viewing condition thereof.

* * * * *